United States Patent
Kim et al.

(10) Patent No.: US 10,040,980 B2
(45) Date of Patent: Aug. 7, 2018

(54) PHOTO-CURABLE RESIN COMPOSITION FOR ADHESIVE FILM AND ADHESIVE FILM

(71) Applicant: LG Chem, Ltd., Seoul (KR)

(72) Inventors: Ji-Hye Kim, Bucheon-si (KR); Hong-June Choi, Yongin-si (KR); Byung-Ho Ra, Uijeongbu-si (KR); Jang-Soon Kim, Seongnam-si (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/022,926

(22) PCT Filed: Mar. 16, 2015

(86) PCT No.: PCT/KR2015/002516
§ 371 (c)(1),
(2) Date: Mar. 17, 2016

(87) PCT Pub. No.: WO2015/142009
PCT Pub. Date: Sep. 24, 2015

(65) Prior Publication Data
US 2016/0222260 A1    Aug. 4, 2016

(30) Foreign Application Priority Data
Mar. 21, 2014 (KR) .................. 10-2014-0033336

(51) Int. Cl.
*C09J 133/08* (2006.01)
*C08F 2/38* (2006.01)
*C09D 4/00* (2006.01)

(52) U.S. Cl.
CPC ............. *C09J 133/08* (2013.01); *C08F 2/38* (2013.01); *C09D 4/00* (2013.01)

(58) Field of Classification Search
CPC ............. C08F 2/38; C08F 133/06; C09D 4/00

USPC ........................................................ 522/182
See application file for complete search history.

(56) References Cited

U.S. PATENT DOCUMENTS

| | | | |
|---|---|---|---|
| 6,472,451 B2 | 10/2002 | Ha et al. | |
| 7,169,825 B2* | 1/2007 | Narayan-Sarathy | C08F 8/34 522/13 |
| 7,985,809 B2* | 7/2011 | Krawczyk | C08F 2/38 525/529 |
| 2005/0119366 A1 | 6/2005 | Moy et al. | |
| 2009/0156747 A1* | 6/2009 | Lu | C08F 2/48 525/221 |
| 2011/0232047 A1 | 9/2011 | Ogura | |
| 2012/0071587 A1* | 3/2012 | Defoort | C08J 5/24 523/467 |
| 2012/0157564 A1* | 6/2012 | Kurata | C08F 2/48 522/182 |
| 2014/0044915 A1 | 2/2014 | Niwa et al. | |

FOREIGN PATENT DOCUMENTS

| | | |
|---|---|---|
| JP | 2010248455 A | 11/2010 |
| JP | 2013094302 A | 5/2013 |
| JP | 2013170215 A | 9/2013 |
| JP | 2013231167 A * | 11/2013 |
| KR | 20110042211 A | 4/2011 |
| KR | 20130129841 A | 11/2013 |
| KR | 20140019759 A | 2/2014 |

OTHER PUBLICATIONS

International Search Report dated May 27, 2015 corresponding to International Application No. PCT/KR2015/002516.

* cited by examiner

*Primary Examiner* — Sanza L. McClendon
(74) *Attorney, Agent, or Firm* — Lerner, David, Littenberg, Krumholz & Mentlik, LLP

(57) ABSTRACT

Disclosed is a photo-curable resin composition for an adhesive film comprising a (meth)acrylic acid ester-based photo-curable resin which is end-capped and cross-linked with a multifunctional molecular weight regulator.

9 Claims, No Drawings

PHOTO-CURABLE RESIN COMPOSITION FOR ADHESIVE FILM AND ADHESIVE FILM

CROSS REFERENCE TO RELATED APPLICATION

This application claims the priority of Korean Patent Application No. 10-2014-0033336, filed on Mar. 21, 2014 in the KIPO (Korean Intellectual Property Office). Further, this application is the National Phase application of International Application No. PCT/KR2015/002516 filed Mar. 16, 2015, which designates the United States and was published in Korean.

TECHNICAL FIELD

The present disclosure relates to a photo-curable resin composition for an adhesive film and the adhesive film.

BACKGROUND ART

Adhesive films have been widely used as an adhesive for bonding between electronic components, built-in kitchen units or home interior furniture, or automobile interior and exterior materials.

DISCLOSURE

Technical Problem

One embodiment of the present disclosure is to provide a photo-curable resin composition capable of producing an adhesive film with improved durability.

Another embodiment of the present disclosure is to provide an adhesive film prepared from the photo-curable resin composition.

Technical Solution

In one embodiment of the present disclosure, a photo-curable resin composition comprising a (meth)acrylic acid ester-based photo-curable resin which is end-capped and crosss-linked with a multifunctional molecular weight regulator is provided.

The (meth)acrylic acid ester-based photo-curable resin may have a weight average molecular weight of 3,000,000 to 15,000,000.

The multifunctional molecular weight regulator may be multifuntional as having at least two functional groups (at least bifunctional).

The multifunctional molecular weight regulator may be a tri-functional to hexa-functional thiol-containing compound.

The multifunctional molecular weight regulator may include at least one selected from the following: tris-[(3-mercaptopropionyloxy)-ethyl]isocyanurate, trimethylolpropane tris-3-mercaptopropionate, pentaerythritol tetrakis-3-mercaptopropionate, dipentaerythritol hexa-3-mercaptopropionate, pentaerythritol tetrakis(3-mercaptobutyrate), and combinations thereof.

The (meth)acrylic acid ester-based photo-curable resin may be polymerized by mixing 100 parts by weight of (meth)acrylic acid ester-based monomers and 0.001 to 1.0 parts by weight of the molecular weight regulator.

The (meth)acrylic acid ester-based monomers may be a cured material of an acrylic photo-curable resin composition or an epoxy acrylate-based photo-curable resin composition including at least one selected from the group consisting of methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isobornyl (meth)acrylate, isononyl (meth)acrylate, and combinations thereof.

The (meth)acrylic acid ester-based photo-curable resin may be obtained by copolymerizing the (meth)acrylic acid ester-based monomers with cross-linkable monomers that include at least one selected from a hydroxyl group-containing monomer, a carboxyl group-containing monomer or a nitrogen-containing monomer, and combinations thereof.

The cross-linkable monomers may include at least one selected from the group consisting of 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethyleneglycol (meth)acrylate, 2-hydroxypropyleneglycol (meth)acrylate, (meth)acrylic acid, 2-(meth)acryloyloxy acetic acid, 3-(meth)acryloyloxy propyl acid, 4-(meth)acryloyloxy butyl acid, acrylic acid dimer, itaconic acid, maleic acid, 2-isocyanatoethyl (meth)acrylate, 3-isocyanatopropyl (meth)acrylate, 4-isocyanatobutyl (meth)acrylate, (meth)acrylamide, N-vinyl pyrrolidone, N-vinyl caprolactam, and combinations thereof.

The photo-curable resin composition for an adhesive film may further include a photo-initiator.

The photo-initiator may include at least one selected from the group consisting of a phosphorus-benzo initiator, a hydroxy ketone-based initiator, an aminoketone-based initiator, a caprolactam-based initiator, and combinations thereof.

In another embodiment of the present disclosure, an adhesive film including a photo-cured material of the photo-curable resin composition for the adhesive film.

Advantageous Effects

The photo-curable resin composition can provide an adhesive film with improved durability.

BEST MODE

Hereinafter, embodiments of the present disclosure will be described in more detail. However, it should be understood that the present disclosure is not limited to the following embodiments, but are provided for illustrative purposes only. The scope of the disclosure should be defined only by the accompanying claims and equivalents thereof.

In an embodiment of the disclosure, there is provided a photo-curable resin composition comprising a (meth)acrylic acid ester-based photo-curable resin which is end-capped and cross-linked with a multifunctional molecular weight regulator.

The (meth)acrylic acid ester-based photo-curable resin may be prepared to have a predetermined range of molecular weight by using a multi-functional molecular weight regulator during the synthesis of the resin.

For example, the (meth)acrylic acid ester-based photo-curable resin may have a weight average molecular weight of about 3,000,000 to about 15,000,000. The photo-curable resin composition for an adhesive film may include the (meth)acrylic acid ester-based photo-curable resin having a high molecular weight of about 3,000,000 to about 15,000,000 in weight average molecular weight, thereby allowing for an adhesive film prepared from the photo-curable resin composition to have improved durability.

The (meth)acrylic acid ester-based photo-curable resin is end-capped with the multifunctional molecular weight regulator, and then unreacted functional group(s) in the multi-functional molecular weight regulator may act as an additional cross-linkable agent during the photocuring of the photo-curable resin composition. As a result, after the photocuring of the photo-curable resin composition, a cured product may be formed in a three dimensional cross-linked structure, and the cure density of the product may also be further increased.

When the cure density of the cured product of the photo-curable resin composition becomes high, then its durability, in particular high temperature properties, for example, physical properties such as high temperature shear strength can be improved.

The multifunctional molecular weight regulator may be at least bi-functional, in particular, a tri-functional to hexa-functional thiol group-containing compound.

If in the synthesis of the (meth)acrylic acid ester-based photo-curable resin, a mono-functional molecular weight regulator is used instead of the multi-functional molecular weight regulator, since unreacted mono-functional molecular weight regulator still remaining in the photo-curable resin composition for an adhesive film may act as reducing the chain structures of the cured product rather than as cross-linking them in the process of the photo-curing, it may cause to lower the molecular weight of the cured product of the (meth)acrylic acid ester-based photo-curable resin, so that the durability may be lowered.

Meanwhile, in the case of the multi-functional molecular weight regulator such as at least bi-functional or more, the capability of controlling the polymer chain length is lower than in the case of the mono-functional. However, since the multi-functional molecular weight regulator may act as a cross-linkable agent during the polymerization or curing of the photo-curable resin composition, it may increase the molecular weight of the polymerized or cured product. Specifically, in the multi-functional molecular weight regulator, one of, for example, the at least two functional groups may be reacted with a monomer to connect to the end of the monomer or the polymer. At this time, the multi-functional molecular weight regulator still has at least one functional group remaining. Therefore, the still remained at least one functional group may be reacted again with another monomer or polymer. For this reason, the multi-functional molecular weight regulator may act as a cross-linkable agent. When the multi-functional molecular weight regulator has only one functional group, it may act as an end-capping agent in connection with the terminals of the monomer or polymer, which will in turn act as a chain-breaking agent in the polymerization reaction.

When the multi-functional molecular weight regulator is a tri- to hexa-functional thiol group-containing compound, the thiol group may act as a cross-linkable agent which reacts with a double bond of the (meth)acrylic acid ester-based photo-curable resin.

The multifunctional molecular weight regulator may include, for example, at least one selected from the following: tris-[(3-mercaptopropionyloxy)-ethyl]isocyanurate, trimethylolpropane tris-3-mercaptopropionate, pentaerythritol tetrakis-3-mercaptopropionate, dipentaerythritol hexa-3-mercaptopropionate, pentaerythritol tetrakis(3-mercaptobutyrate), and combinations thereof.

In order to prepare the photo-curable resin composition for an adhesive film, the (meth)acrylic acid ester-based photo-curable resin which is end-capped with the multifunctional molecular weight regulator is in advance prepared. The (meth)acrylic acid ester-based photo-curable resin may be polymerized by mixing 100 parts by weight of (meth)acrylic acid ester-based monomers and about 0.001 to about 1.0 parts by weight of the molecular weight regulator.

During the polymerization of the (meth)acrylic acid ester-based photo-curable resin, a resin having a desired degree of a molecular weight may be synthesized using the above content range of the multi-functional molecular weight regulator. When the multi-functional molecular weight regulator is used in excessive of the above content range, a side reaction may occur where thiol groups are reacted each other, which results in lowering the purity of the resin.

The (meth)acrylic acid ester-based monomer may be, for example, alkyl (meth)acrylate, but not limited thereto. The alkyl in the alkyl (meth)acrylate may be a linear or branched $C_1$-C14 alkyl, and particularly C1-C8 alkyl.

The (meth)acrylic acid ester-based monomers may include at least one selected from the group consisting of methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isobornyl (meth)acrylate, isononyl (meth)acrylate, and combinations thereof.

The (meth)acrylic acid ester-based photo-curable resin may be copolymerized with a cross-linkable monomer, together with the (meth)acrylic acid ester-based monomer.

As used herein, the term "cross-linkable monomer" means a monomer that includes a copolymerizable functional group (e.g., carbon-carbon double bonds) and a cross-linkable functional group in the molecular structure at the same time.

The cross-linkable monomer may include, for example, at least one selected from the group consisting of a hydroxyl group-containing monomer, a carboxyl group-containing monomer or a nitrogen-containing monomer, and combinations thereof.

Particularly, the cross-linkable monomer may include at least one selected from the group consisting of hydroxyl group-containing monomers such as 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethyleneglycol acrylate, 2-hydroxypropyleneglycol (meth)acrylate, (meth)acrylic acid, 2-(meth)acryloyloxy acetic acid, 3-(meth)acryloyloxy propyl acid, or 4-(meth)acryloyloxy butyl acid; carboxyl group-containing monomers such as acrylic acid dimer, itaconic acid, or maleic acid; nitrogen-containing monomers such as 2-isocyanatoethyl (meth)acrylate, 3-isocyanatopropyl (meth)acrylate, 4-isocyanatobutyl (meth)acrylate, (meth)acrylamide, N-vinyl pyrrolidone, or N-vinyl caprolactam, and combinations thereof.

The photo-curable resin composition for an adhesive film may further include a photo-initiator to control the degree of polymerization for the photo-curable composition. The photoinitiator may be used in a content of about 0.01 parts by weight to about 10 parts by weight based on 100 parts by weight of the (meth)acrylic acid ester-based photo-curable resin. The type of the photoinitiator is not particularly limited as long as it can initiate the polymerization reaction, and include, for example, at least one selected from the group consisting of phosphorus-benzo initiator, hydroxy ketone-based initiator, aminoketone-based initiator, caprolactam-based initiator, and combinations thereof.

Further, if the photo-curable resin composition for an adhesive film may be used in a range that does not affect the present disclosure, it may further include at least one adhesive selected from the group consisting of an epoxy resin, a cross-linkable agent, a UV stabilizer, an antioxidant, a colorant, a reinforcing agent, a filler, an anti-foaming agents, surfactants, a plasticizer, and combinations thereof.

In another embodiment of the present disclosure, an adhesive film including a photo-cured material of the photo-curable resin composition for the adhesive film is provided.

The adhesive film may be widely used as an adhesive for bonding between electronic components, built-in kitchen units or home interior furniture, or automobile interior and exterior materials. The durability of the adhesive film is excellent.

In one embodiment, the adhesive film may be prepared by applying or coating the photo-curable adhesive film for the adhesive film on a substrate, followed by photo-curing the same to form the film. For example, the adhesive film may be formed on a release film as a substrate, or the adhesive film may be used by removing the release film when applying to a specific application.

The adhesive film is excellent in durability since it can be prepared using the (meth)acrylic acid ester-based photo-curable resin having a high molecular weight as described above.

Hereinafter, Examples and Comparative Examples of the present disclosure will now be described. However, it should be noted that while exemplary examples are listed for explaining the present disclosure, the present disclosure is not limited to these exemplary examples.

EXAMPLES

Example 1

91 parts by weight of 2-EHA (ethylhexyl acrylate), 9 parts by weight of acrylic acid as a cross-linkable monomer, and 0.005 parts by weight of 1-hydroxycyclohexyl phenyl ketone (Irgacure 184, BASF Corporation) as a photo-polymerization initiator was charged into a 1 L glass reactor, and then 0.005 parts by weight of pentaerythritol tetrakis-3-mercaptopropionate (PEMP, SC Organic Chemical) was added as a multi-functional molecular weight regulator. The mixture was purged with nitrogen for 30 minutes, and the gas in the solution was replaced with nitrogen. The mixture was photo-polymerized with a UV irradiation using a black fluorescent lamp to form a (meth)acrylic acid ester-based photo-curable resin. The weight average molecular weight and PDI of the polymerized (meth)acrylic acid ester photo-curable resin were measured using a GPC (1260 Infinity, Agilent, Inc.), and the measured weight average molecular weight and PDI values were shown in Table 1 below.

To the synthesized (meth)acrylic acid ester-based photo-curable resin, a photo-initiator, a curing agent, and other additives were added and mixed to form a photo-curable resin composition. The photo-curable resin composition was coated on a PET release film, and then photo-cured with an ultraviolet light using a UV lamp for 10 minutes to prepare an adhesive film.

Comparative Example 1

A photo-curable resin composition and an adhesive film were prepared in the same manner as in Example 1, except that n-dodecyl mercaptan (n-DDM) was used as the molecular weight regulator.

Evaluations

Measurement of High Temperature Dynamic Shear Strength

For the adhesive films in Example 1 and Comparative Example 1, the adhesive films were laminated between SUS plates, and pressed under 6 kg load for 30 seconds, and then aged at room temperature to attach, respectively. Then, both sides of the substrates were pulled at the cross head speed of 1.0 mm/min at 80° C. using a universal testing machine (UTM) equipped with a high temperature maintenance chamber to measure the high temperature dynamic shear strength.

TABLE 1

| | Weight average molecular weight | PDI | Durability [$kg/cm^2$] |
|---|---|---|---|
| Ex. 1 | 1,700,000 | 2.0 | 1.1 |
| C. Ex. 1 | 1,590,000 | 1.5 | 0.5 |

As seen from the results of Table 1, the shear strength of Example 1 was found to be superior to Comparative Example 1, and as a result the durability was excellent.

While the preferred examples of the invention have been shown and described, it should be understood that various substitutions, modifications and variations may be made by those skilled in the art without departing from the spirit or scope of the invention. Accordingly, all such modifications and variations are included in the scope of the invention as defined by the following claims.

The invention claimed is:

1. A photo-curable resin composition for an adhesive film, the photo-curable resin composition comprising a (meth)acrylic acid ester-based photo-curable resin, which is end-capped and cross-linked with a multifunctional molecular weight regulator,
wherein the (meth)acrylic acid ester-based photo-curable resin is obtained from a mixture comprising a (meth)acrylic acid ester-based monomer, a cross-linkable monomer and the multifunctional molecular weight regulator, and the content of the multifunctional molecular weight regulator is 0.001 to 1.0 parts based on 100 parts by weight of the (meth)acrylic acid ester-based monomer,
wherein the cross-linkable monomer comprises at least one selected from a hydroxyl group-containing monomer, a carboxyl group-containing monomer and a nitrogen-containing monomer, and
wherein the (meth)acrylic acid ester-based photo-curable resin has a weight average molecular weight of 1,700,000 to 15,000,000.

2. The photo-curable resin composition of claim 1, wherein the multifunctional molecular weight regulator is multifuntional as having at least two functional groups.

3. The photo-curable resin composition of claim 1, wherein the multifunctional molecular weight regulator is a tri-functional to hexa-functional thiol-containing compound.

4. The photo-curable resin composition of claim 1, wherein the multifunctional molecular weight regulator comprises at least one selected from the group consisting of tris-[(3-mercaptopropionyloxy)-ethyl]isocyanurate, trimethylolpropane tris-3-mercaptopropionate, pentaerythritol tetrakis-3-mercaptopropionate, dipentaerythritol hexa-3-mercaptopropionate, and pentaerythritol tetrakis(3-mercaptobutyrate).

5. The photo-curable resin composition of claim 1, wherein the (meth)acrylic acid ester-based monomers are a cured material of an acrylic photo-curable resin composition or an epoxy acrylate-based photo-curable resin composition comprising at least one selected from the group consisting of methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isobornyl (meth)acrylate, and isononyl (meth)acrylate.

6. The photo-curable resin composition of claim 1, wherein the cross-linkable monomer comprises at least one selected from the group consisting of 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethyleneglycol (meth)acrylate, 2-hydroxypropyleneglycol (meth)acrylate, (meth)acrylic acid, 2-(meth)acryloyloxy acetic acid, 3-(meth)acryloyloxy propyl acid, 4-(meth)acryloyloxy butyl acid, acrylic acid dimer, itaconic acid, maleic acid, 2-isocyanatoethyl (meth)acrylate, 3-isocyanatopropyl (meth)acrylate, 4-isocyanatobutyl (meth)acrylate, (meth)acrylamide, N-vinyl pyrrolidone, and N-vinyl caprolactam.

7. The photo-curable resin composition of claim 1, further comprising a photo-initiator.

8. The photo-curable resin composition of claim 7, wherein the photo-initiator comprises at least one selected from the group consisting of a phosphorus-benzo initiator, a hydroxy ketone-based initiator, an aminoketone-based initiator, and a caprolactam-based initiator.

9. An adhesive film comprising a photo-cured material of the photo-curable resin composition for the adhesive film according to claim 1.

* * * * *